Sept. 5, 1950          J. E. MOUL          2,521,396
GAS AND LIQUID CONTACT APPARATUS Filed Dec. 22, 1945          2 Sheets-Sheet 2

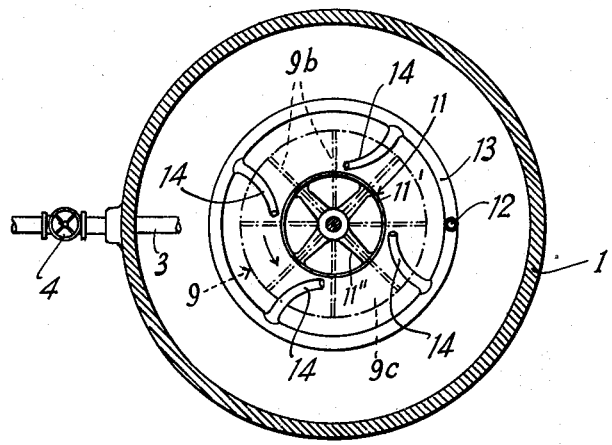
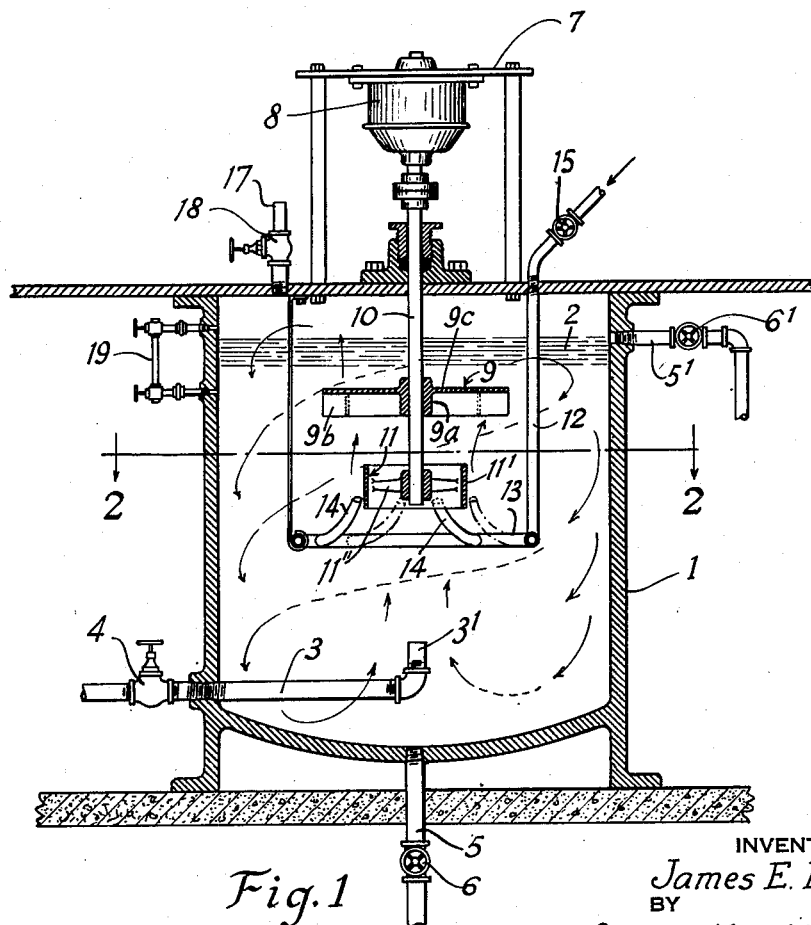

INVENTOR
James E. Moul
BY
Ramsey, Kent & Chisholm
ATTORNEYS

UNITED STATES PATENT OFFICE 2,521,396

GAS AND LIQUID CONTACT APPARATUS

James E. Moul, Scarsdale, N. Y., assignor to The Turbo-Mixer Corporation, New York, N. Y., a corporation of New York Application December 22, 1945, Serial No. 636,578

2 Claims. (Cl. 261—93)

This invention relates to gas-and-liquid-contact apparatus for the processing or treatment of liquids with gases or vice versa. It is particularly applicable to mixing or dissolving tanks in which the liquid is circulated by one or more rotating impellers while gas is introduced and brought into intimate contact with the liquid.

In apparatus of this type it is desirable to cause the gas introduced into the liquid to be reduced to bubbles of the smallest practicable size for the reason that the smaller the bubbles produced in the liquid, the greater the relative surface of gas presented into contact with the liquid and consequently the more rapid the interaction between the gas and the liquid. Moreover, the smaller the bubbles of gas are, the less is their effective buoyancy tending to cause the gas to rise to the surface, and the less tendency there is for the bubbles which approach each other to break the surface tension of the liquid between them and coalesce into larger bubbles. Thus, in apparatus of this type important desiderata are the prompt and efficient breaking up of the incoming gas into the smallest particles or bubbles that is practicable, and the quickest possible dispersion of such particles or bubbles throughout the liquid.

These results have heretofore been sought to be attained in various ways, many of which involved agitation or churning of the liquid as the gas is introduced. For many purposes, however, appreciable agitation or churning is undesirable because of the large expenditure of energy it requires, which energy is irrecoverable and becomes a considerable item of expense in a commercial installation.

It is important therefore in operations of this kind in commercial plants that the diffusion of the gas be accomplished with as little expenditure of energy as possible, and that prolonged entrainment of the gas in the liquid be obtained with as little expenditure of energy as possible. It is therefore desirable that, on the discharge of the gas into the liquid, it be immediately separated into small bubbles without churning or undue agitation and that then the bubbles be widely dispersed in the liquid and be entrained therein for a relatively long time.

Various devices have been employed heretofore to cause the incoming gas to be broken up into small bubbles, such as screens and dispersing targets, against which the gas is discharged. The present invention not only obtains the advantage of the breaking up of the jet or jets of gas by targets, but also that of quickly carrying the liquid and commingled gas away from the region of impact, so that the gas may pass into a general circulation of the liquid with the least possible agitation thereof. Also the present invention simplifies and improves the apparatus from a structural standpoint.

An object of the invention is to accomplish efficient and rapid interaction of a gas and a liquid with relatively small consumption of mechanical energy.

Another object of the invention is to reduce agitation and churning in connection with the introduction of the gas into the liquid.

A further object of the invention is to discharge the gas in a jet or jets against a moving target for the purpose, not only of spreading the jet and breaking up the gas into fine bubbles, but also for the purpose of aiding in entraining the gas in the adjacent liquid and forming a common current and direction of flow with a minimum of counterflow.

Additional objects of the invention are to accomplish the results above indicated without introducing into the liquid bearings or supports which have movement relative to other mechanical parts within the body of liquid, and to accomplish the desired results with mechanism in which the circulatory reaction is balanced to avert lateral stresses.

Various other objects and advantages will appear to those skilled in the art on consideration of the following disclosure.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is a partly diagrammatic vertical section showing an apparatus embodying the invention.

Fig. 2 is a partly diagrammatic horizontal section on the line 2—2 of Fig. 1, with the impeller superimposed thereon in dot-dash lines.

Figure 4:
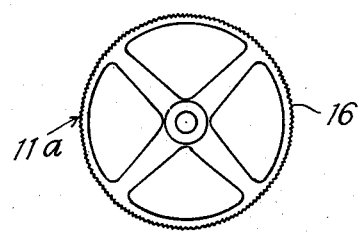
Fig. 4 is a plan view of the rotary gas target shown in Fig. 3.

Referring to Fig. 1, a tank or container 1 is provided for reception of a charge of liquid 2. A liquid inlet conduit 3 may extend inwardly to the central axis of the tank and be turned vertically upwards at 3'. An inlet valve 4 is provided to control introduction of the charge into the tank. An outlet or drainage conduit 5 and outlet valve 6 are suitably placed to drain the contents out of the container 1, for cleaning of the container, or for removal of the charge when treatment has been completed if batch procedure is being used. For continuous procedure valve 6 may be kept closed, and the liquid be continuously fed into the tank through inlet 3 and be continuously drawn off through outlet pipe 5' which is controlled by valve 6'.

Upon a suitable support 7 above the container 1, is mounted a motor 8 which rotates a depending shaft 10 on which is mounted a circulator or impeller 9. This impeller has a hub 9a affixed to shaft 10, and has a series of blades such as 9b which extend outwardly from the hub for a substantial distance. The series of blades is wholly or partially covered by disc-like member 9c, and the impeller discharges outwardly in a horizontal plane. Preferably motor 8 and shaft 10 are so mounted as to coincide with the central vertical axis of container 1.

Fixedly secured to shaft 10, beneath impeller 9, is a rotary gas target 11 which may be in the form of a shell having a smooth cylindrical peripheral surface 11' which is coaxial with the shaft 10. A series of spokes 11" connect the shell with a hub which is affixed to the shaft. The size of shell 11 is so related to the blades 9b of impeller 9 that the inner ends of the impeller blades are substantially closer to shaft 10 than is the outer surface 11' of gas target, and the outer ends of the impeller blades are substantially farther from shaft 10 than is the outer surface 11' of the gas target.

A conduit or pipe 12, which is controlled by a valve 15, serves to lead gas under pressure into the tank for interaction with the liquid. Pipe 12 communicates with an annular header or manifold 13 (see Fig. 2) from which an annularly disposed series of nozzles 14 extend in such direction as to discharge streams of gas against the surface 11' of the rotating target. The streams of gas are directed at an obtuse angle to the surface of cylinder 11, that is in respect to the vertical plane angle measured upwardly from the stream to the surface 11' of the cylinder. While the streams of gas may be projected in radial planes, the nozzles may be inclined in the direction of rotation of target 11 as shown in Fig. 2 thereby diminishing agitation or churning of the liquid adjacent to the surface of the target. By placing the ends of the nozzles close to the target, the gas will be compelled to spread rapidly outward in a relatively thin sheet, thereby facilitating the breaking up of the gas into small bubbles which will be rapidly dispersed.

Preferably nozzles 14 are equally spaced about target 11 so that the reactive forces produced by the jets of gas will balance out and not impose lateral thrust on shaft 10. Upon leaving the nozzles the gas is promptly and uniformly broken up into fine bubbles by the rotating target. As the bubbles are formed they are promptly entrained in the currents of liquid being drawn upwardly by impeller 9. If the target 11 be a shell or open-ended cylinder as shown in Fig. 1, part of the ascending liquid will pass inside of the target and part outside of the target in streamline fashion. The spokes 11" of the gas target may be formed as propeller blades which augment the flow of that portion of the liquid that passes upwardly through the target. The size of the target is so related to the impeller that the ascending mass of gas bubbles will be squarely engaged by the blades 9b of impeller 9. After discharge by the impeller, the mixed liquid and gas moves outwardly to a zone adjacent to the tank wall, then downwardly to a zone near the bottom of the tank, and then inwardly toward the axis of the tank and back upwardly. As this circulatory movement progresses, the gas bubbles gradually separate out and rise to the space at the top of the tank. From this space the gas may be allowed to pass off through pipe 17, which is controlled by valve 18.

Figure 5:
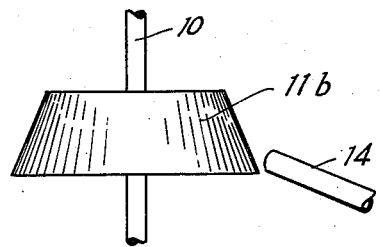
Fig. 5 is a diagrammatic elevational view showing a third form of rotary gas target which may be used in apparatus such as shown in Fig. 1.
Figure 6:
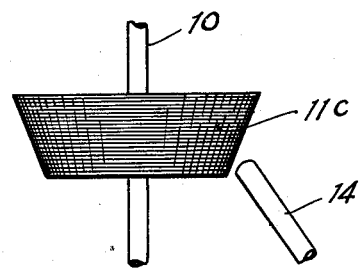
Fig. 6 is a diagrammatic elevational view showing a fourth form of rotary gas target which may be used in apparatus such as shown in Fig. 1.

The rotary gas target, instead of being a cylindrical shell, may be of other forms, such as a frusto-conical shell which may be mounted on the shaft either big-end-up or big-end-down. Fig. 5 shows a frusto-conical gas target 11b mounted big-end-down on the shaft 10, while Fig. 6 shows a frusto-conical target 11c mounted big-end-up on the shaft 10. Whatever the form of the targets, the jets 14 (one shown in Figs. 3, 5 and 6) are preferably so inclined that the streams of gas are impinged on the surface of the target at an obtuse angle in respect to the vertical plane angle measured upwardly from the stream to the surface of the target. The frusto-conical targets shown in Figs. 5 and 6 may be provided with a hub affixed to shaft 10, and the shell may be connected to the hub by means of spokes which act as propeller blades as explained in connection with Figs. 1 and 2.

Figure 7:
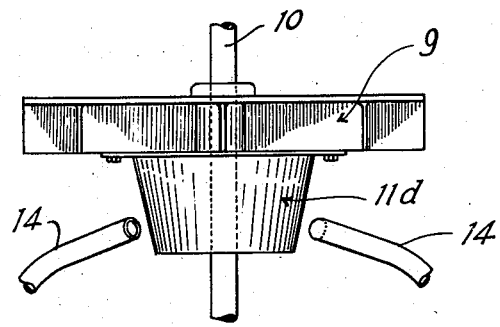
Fig. 7 is a diagrammatic elevational view showing a combined circulator and rotary gas target which may be used in apparatus such as shown in Fig. 1.

Fig. 7 shows a gas target 11d in the form of a big-end-up frusto-conical shell secured directly to the underside of impeller 9. In this case the target requires no hub for attachment to the shaft 10, but the interior of the target may be provided with propeller blades to aid liquid flow upwardly through the target. With the combined impeller and rotary gas target shown in Fig. 7 the gas nozzles 14 (two shown) are also preferably so inclined to the target that the streams of gas will impinge thereon at an obtuse angle measured upwardly in a vertical plane from the stream to the surface of the target.

While Figs. 3, 5, 6 and 7 show diagrammatically only one or two gas nozzles 14 to illustrate the angle with respect to the surface of the target, it will be understood that these targets may be used with an annularly disposed series of nozzles as explained in connection with Figs. 1 and 2.

Figure 3:
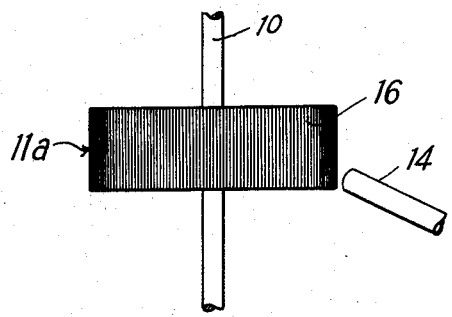
Fig. 3 is a diagrammatic elevational view showing a second form of rotary gas target which may be used in apparatus such as shown in Fig. 1.

For certain purposes the surface of the gas target, whatever its form, may be roughened or striated to aid in breaking the gas into small bubbles and intermixing the gas with the liquid. Figs. 3 and 4 show a gas target 11a, similar to the gas target 11 in Figs. 1 and 2, except that the outer cylindrical surface 16 is roughened by vertically extending striations. The striations may extend in other directions, e. g., horizontally as shown in Fig. 6, or they may be inclined upwardly, preferably in a trailing direction with respect to the rotation of the target thereby aiding in advancing the liquid toward the impeller 9. While vertical striations have been shown only on a cylindrical target and horizontal striations have been shown only on the big-end-up frusto-conical target of Fig. 6, it will be understood that vertical striations, horizontal striations, or inclined striations may be used on any of the forms of gas target shown.

When gas targets of forms such as shown in Figs. 3 through 7 are used, the impeller 9 has blades of substantial length extending outwardly from the shaft and the gas target is so related to the impeller that the inner ends of the impeller blades are substantially closer to the shaft 10 than is the outer surface of the gas target, and the outer ends of the blades are substantially farther from the shaft than is the outer surface of the gas target. By means of this arrangement, the mass of gas bubbles rising from adjacent to the surface of the gas target will be squarely engaged by the blades of the impeller, as previously explained in connection with Figs. 1 and 2.

I claim:

1. Gas-and-liquid-contact apparatus comprising: a tank for the liquid, a rotary shaft depending into the tank, a circulator for the liquid having a hub affixed to the shaft and having blades of substantial length extending outwardly from the hub, a rotary gas target positioned beneath said circulator, said gas target having a frusto-conical surface coaxial with the shaft and so positioned that gas bubbles rising from adjacent to said surface will be engaged by the blades of said circulator, and a plurality of annularly disposed upwardly directed nozzles for impinging gas on said rotary frusto-conical surface whereby the gas is divided into small widely dispersed bubbles which rise in the liquid and are engaged by the blades of the circulator.

2. Gas-and-liquid-contact apparatus comprising: a tank for the liquid, a rotary shaft depending into the tank, a rotary gas target affixed to the shaft, said gas target having an exterior surface coaxial with the shaft, said surface being of circular cross-axial section and being of substantial dimension lengthwise of the shaft, a plurality of annularly disposed nozzles for impinging streams of gas on the exterior surface of the rotary gas target at obtuse angles thereto in respect to the upward arc from the line of the stream to the surface of the target, and a circulator for the liquid, the circulator being located above the gas target, having a hub affixed to the shaft, having blades of substantial length extending outwardly from the hub, the inner ends of said blades being substantially closer to the shaft than said gas target surface, and the outer ends of said blades being substantially farther from the shaft than said gas target surface.

JAMES E. MOUL.

REFERENCES CITED

The following references are of record in the file of this patent:

UNITED STATES PATENTS

| Number | Name | Date |
|---|---|---|
| 844,996 | Colbath | Feb. 19, 1907 |
| 1,505,204 | Kiernan | Aug. 19, 1924 |
| 1,854,754 | Morris | Apr. 19, 1932 |
| 2,123,816 | Utsman | July 12, 1938 |
| 2,170,496 | Gard et al. | Aug. 22, 1939 |
| 2,308,751 | Guthrie | Apr. 24, 1941 |